US011437188B2

United States Patent
Piascik et al.

(10) Patent No.: US 11,437,188 B2
(45) Date of Patent: Sep. 6, 2022

(54) LOW POROSITY GLASS COATINGS FORMED ON COILED WIRES, HIGH TEMPERATURE DEVICES CONTAINING THE SAME, AND METHODS FOR THE FABRICATION THEREOF

(71) Applicant: HONEYWELL INTERNATIONAL INC., Morris Plains, NJ (US)

(72) Inventors: James Piascik, Randolph, NJ (US); Jimmy Wiggins, Chandler, AZ (US); Harry Lester Kington, Scottsdale, AZ (US); Martin Carlin Baker, Budd Lake, NJ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 929 days.

(21) Appl. No.: 16/141,263

(22) Filed: Sep. 25, 2018

(65) Prior Publication Data

US 2020/0098516 A1 Mar. 26, 2020

(51) Int. Cl.
*H01F 41/12* (2006.01)
*C23D 5/00* (2006.01)
(Continued)

(52) U.S. Cl.
CPC ............ *H01F 41/127* (2013.01); *C23D 5/005* (2013.01); *C23D 13/00* (2013.01); *H01F 27/022* (2013.01); *H01F 27/2823* (2013.01)

(58) Field of Classification Search
CPC ........ H01F 41/127; C23D 5/005; C23D 13/00
See application file for complete search history.

(56) References Cited

U.S. PATENT DOCUMENTS 2,907,665 A 10/1959 Fraher
3,029,403 A 4/1962 Krueger
(Continued)

FOREIGN PATENT DOCUMENTS

EP 2660832 A2 11/2013

OTHER PUBLICATIONS

EP Extended Search Report for Application No. 16152838.5-1904 dated Jun. 30, 2016.
(Continued)

*Primary Examiner* — Peter Dungba Vo
*Assistant Examiner* — Jose K Abraham
(74) *Attorney, Agent, or Firm* — Lorenz & Kopf, LLP

(57) ABSTRACT

Methods for fabricating wires insulated by low porosity glass coatings are provided, as are high temperature electromagnetic (EM) devices containing such wires. In embodiments, a method for fabricating a high temperature EM device includes applying a glass coating precursor material onto a wire. The glass coating precursor material contains a first plurality of glass particles having an initial softening point. After application onto the wire, the glass coating precursor material is heat treated under process conditions producing a crystallized intermediary glass coating having a modified softening point exceeding the initial softening point. The crystallized intermediary glass coating is then infiltrated with a filler glass precursor material containing a second plurality of glass particles. After infiltration, the filler glass precursor material is heat treated to consolidate the second plurality of glass particles into the crystallized intermediary glass coating and thereby yield a low porosity glass coating adhered to the wire.

15 Claims, 3 Drawing Sheets

(51) Int. Cl.
*C23D 13/00* (2006.01)
*H01F 27/02* (2006.01)
*H01F 27/28* (2006.01)

(56) References Cited

U.S. PATENT DOCUMENTS

| | | | |
|---|---|---|---|
| 3,389,458 A * | 6/1968 | Ostrander | C03C 10/16 |
| | | | 29/605 |
| 3,418,710 A | 12/1968 | Siedel et al. | |
| 3,456,224 A | 7/1969 | Hortsman | |
| 3,483,052 A | 9/1969 | Siedel et al. | |
| 4,025,379 A | 5/1977 | Whetstone | |
| 4,103,195 A | 7/1978 | Torossian et al. | |
| 4,227,108 A | 10/1980 | Washizu et al. | |
| 4,591,529 A | 5/1986 | Behringer et al. | |
| 4,608,297 A | 8/1986 | Shimada et al. | |
| 4,677,036 A | 6/1987 | Nakamura et al. | |
| 5,118,643 A | 6/1992 | Jean et al. | |
| 5,632,942 A | 5/1997 | Yeh et al. | |
| 6,509,687 B1 | 1/2003 | Natarajan et al. | |
| 6,974,385 B2 | 12/2005 | Natarajan et al. | |
| 7,077,919 B2 | 7/2006 | Wood et al. | |
| 7,235,910 B2 | 6/2007 | Decristofaro et al. | |
| 7,262,527 B2 | 8/2007 | Neal | |
| 7,375,609 B2 | 5/2008 | Suzuki et al. | |
| 7,510,766 B2 | 3/2009 | Lemieux | |
| 7,788,792 B2 | 9/2010 | Meacham et al. | |
| 8,288,915 B2 | 10/2012 | Dollé et al. | |
| 8,466,767 B2 | 6/2013 | Piascik et al. | |
| 8,484,831 B2 | 7/2013 | Piascik et al. | |
| 9,508,486 B2 | 11/2016 | Piascik et al. | |
| 2003/0201428 A1 * | 10/2003 | Fukushima | C03C 8/10 |
| | | | 252/570 |
| 2010/0108353 A1 * | 5/2010 | Kaiser | H01B 3/441 |
| | | | 174/110 R |
| 2011/0036123 A1 * | 2/2011 | Adar | C03B 37/026 |
| | | | 65/45 |
| 2012/0023870 A1 * | 2/2012 | Piascik | H01B 3/12 |
| | | | 53/432 |
| 2012/0225784 A1 * | 9/2012 | Piascik | H01B 3/12 |
| | | | 505/150 |
| 2014/0216943 A1 | 8/2014 | Fontana, Jr. et al. | |
| 2014/0238554 A1 | 8/2014 | Yin et al. | |
| 2015/0314563 A1 | 11/2015 | Fluch | |
| 2018/0130600 A1 * | 5/2018 | Xia | H01F 41/127 |
| 2019/0066913 A1 * | 2/2019 | Kluesener | B29C 63/24 |

OTHER PUBLICATIONS

EP Office Action for Application No. 16152838.5 dated May 1, 2018.

* cited by examiner

LOW POROSITY GLASS COATINGS FORMED ON COILED WIRES, HIGH TEMPERATURE DEVICES CONTAINING THE SAME, AND METHODS FOR THE FABRICATION THEREOF

TECHNICAL FIELD

The present invention relates generally to electromagnetic devices and, more particularly, to high temperature electromagnetic devices containing wire coils electrically insulated by low porosity glass coatings, as well as to methods for fabricating such insulated wires and electromagnetic devices.

Abbreviations

Abbreviations appearing relatively infrequently in this document are defined upon initial usage, while abbreviations appearing more frequently in this document are defined below.

CTE—coefficient of thermal expansion;
Cu—copper;
EM—electromagnetic;
ppm/° C.—parts per million per degree Celsius; and
° C.—degrees Celsius.

BACKGROUND

In certain industries, including the oil and gas drilling, chemical processing, and aerospace industries, there exists a continued demand for the provision of EM actuation and sensing functionalities in severe high temperature environments; that is, environments characterized by peak temperatures approaching or exceeding 300° C. and possibly further characterized by pronounced and repeated thermal cycling, high intensity vibration and mechanical shock, and the presence of environmental contaminants, such as moisture. Despite this demand, relatively few, if any EM devices (sensors and actuators) presently exist that are suitable for direct insertion into such environments and readily available at reasonable cost. A technical challenge therefore arises in seeking optimal solutions for providing EM actuation and sensing functionalities in severe high temperature environments.

The above-noted technical challenge can be overcome, in certain instances, by designing a particular system to accommodate the usage of conventional EM devices having limited thermal capabilities (herein, "temperature-limited EM devices"). Depending upon system design and application, a given system may be modified to supply active cooling to a temperature-limited EM device by, for example, circulating a coolant through the device housing. Such a solution is less than ideal, however, and typically results in increasing the overall complexity, part count, weight and cost of the system. Alternatively, a given system may be designed to physically distance a temperature-limited EM device from the peak temperatures and other extremes of the severe high temperature environment, to the extent possible. However, this approach again typically requires undesired tradeoffs in increased weight, envelope, part count, complexity, and cost of the system. Such an increase in weight or "weight penalty" may be particularly undesirable in the context of flight applications when the system at issue assumes the form of a gas turbine engine (GTE) onboard an aircraft.

For the reasons above, it is preferable to develop EM devices capable of reliable and prolonged operation when inserted directly into severe high temperature environments. This is a difficult task, however. It has proven particularly challenging to develop high temperature dielectric coatings suitable for insulating the wire coils contained in high temperature EM devices, while ensuring that such dielectric coatings remain cost effective to manufacture and lack undesired chemical constituents, such as lead, cadmium, and nickel. While certain high temperature wire coatings have been developed that are potential candidates for usage in high temperature EM devices, existing high temperature wire coatings tend to be highly rigid and prone to spallation if applied to a magnet wire prior to winding. Further, existing high temperature wire coatings may be relatively porous and susceptible to the ingress of moisture, which can degrade coating performance over time. Such moisture sensitivity can be compensated for, in at least some instances, by sealing the coated wire coil within a hermetic enclosure, such as a metal vessel to which a lid is circumferentially welded. However, yet again, the formation of such a hermetically-sealed enclosure tends to increase the cost, weight, and bulk of the completed EM device.

There thus exists an ongoing demand for the provision of high temperature EM devices capable of prolonged, reliable operation when inserted directly into severe high temperature environments; e.g., due to an increased tolerance to mechanical shock, high intensity vibration, and moisture ingress on behalf of the high temperature EM device. Similarly, it is desirable to provide EM devices capable of operating at highly elevated temperatures due to heat generated by the EM device itself (also considered a "high temperature operating environment" in the context of this document). There also exists a demand for the provision of methods for fabricating such high temperature EM devices and, more specifically, methods for fabricating electrically-insulated wire coils suitable for usage in high temperature EM devices having such desirable characteristics. Other desirable features and characteristics of embodiments of the present disclosure will become apparent from the subsequent Detailed Description and the appended Claims, taken in conjunction with the accompanying drawings and the foregoing Background.

BRIEF SUMMARY

Methods for fabricating high temperature EM devices, which contain wires electrically insulated by low porosity glass coatings, are provided. In embodiments, the method includes the step or process of applying a glass coating precursor material onto a magnet wire. The glass coating precursor material contains a first plurality of glass particles, which have an initial softening point. The glass coating precursor material may also contain other constituents, such as an organic liquid carrier, an organic binder (e.g., an acrylic), an inorganic nucleating agent, an inorganic thickening agent, or a combination thereof. After application onto the wire, the glass coating precursor material is heat treated to produce a crystallized intermediary glass coating having a modified softening point exceeding the initial softening point. The crystallized intermediary glass coating is then vacuum impregnated or otherwise infiltrated with a filler glass precursor material, which contains a second plurality of glass particles. After infiltration, the filler glass precursor material is heat treated to integrate (melt or sinter) the second plurality of glass particles into the crystallized intermediary glass coating and thereby yield a low porosity glass coating adhered to the wire. Additional steps may be performed to complete fabrication of the EM device, such as installation of a coiled length of the coated wire in a vessel; and, perhaps, back-filling at least a portion of the vessel's interior with an inorganic potting material having a CTE greater than that of the low porosity glass coating.

In other embodiments, the method for fabricating a high temperature EM device includes the step or process of forming, over an outer surface of a magnet wire, an intermediary glass coating at least predominately composed of a first glass, by weight. During formation of the intermediary glass coating, a glass coating precursor material containing particles of the first glass is applied onto the wire, and an intermediary heat treatment process is performed to consolidate (melt or sinter) the glass particles into an intermediary glass coating. Subsequently, the intermediary glass coating is infiltrated with a filler glass precursor material. The filler glass precursor material contains particles composed of a second glass. The first glass has a first CTE, while the second glass has a second CTE substantially equivalent to (that is, differs by less than 10% as compared to) the first CTE; e.g., in embodiments, the first and second glasses may be of the same type. The filler glass precursor material may also contain various other constituents, such as a liquid carrier and possibly a melt point suppressant; e.g., in embodiments, the melt point suppressant may be a lesser amount of third glass having a melt point lower than that of the second glass, with the second and third glasses combined in the filler glass precursor material as a glass mixture. After infiltration of the intermediary glass coating with the filler glass precursor material, a densification heat treatment process is carried-out to integrate (melt or sinter) the particles composed of the second glass into the intermediary glass coating and thereby yield a low porosity glass coating adhered to the wire.

High temperature EM devices, which contain magnet wires insulated by low porosity glass coatings, are further provided. In embodiments, the high temperature EM device includes at least one wire coil, which contains a metal (e.g., Cu) core having a first CTE. A low porosity glass coating is adhered to an outer surface of the wire coil and has a second CTE, which is equal to or exceeds one half of the first CTE, while being less than the first CTE. The high temperature EM device further includes a vessel, housing, or casing in which the wire coil and the low porosity glass coating are disposed. An inorganic dielectric potting material, such as inorganic cement or a high temperature silicone, at least partially fills the interior of the vessel and contacts the low porosity glass coating. The inorganic potting material has a third CTE, which is less than the second CTE. In at least some implementations, the low porosity glass coating contains a majority glass, by weight; between about 0.1% and about 20% of an inorganic viscosity boosting or thickening agent, by weight; and between about 0.1% and about 20% of a nucleating agent, by weight.

Various additional examples, aspects, and other useful features of embodiments of the present disclosure will also become apparent to one of ordinary skill in the relevant industry given the additional description provided below.

BRIEF DESCRIPTION OF THE DRAWINGS

At least one example of the present invention will hereinafter be described in conjunction with the following figures, wherein like numerals denote like elements, and.

Figure 1:
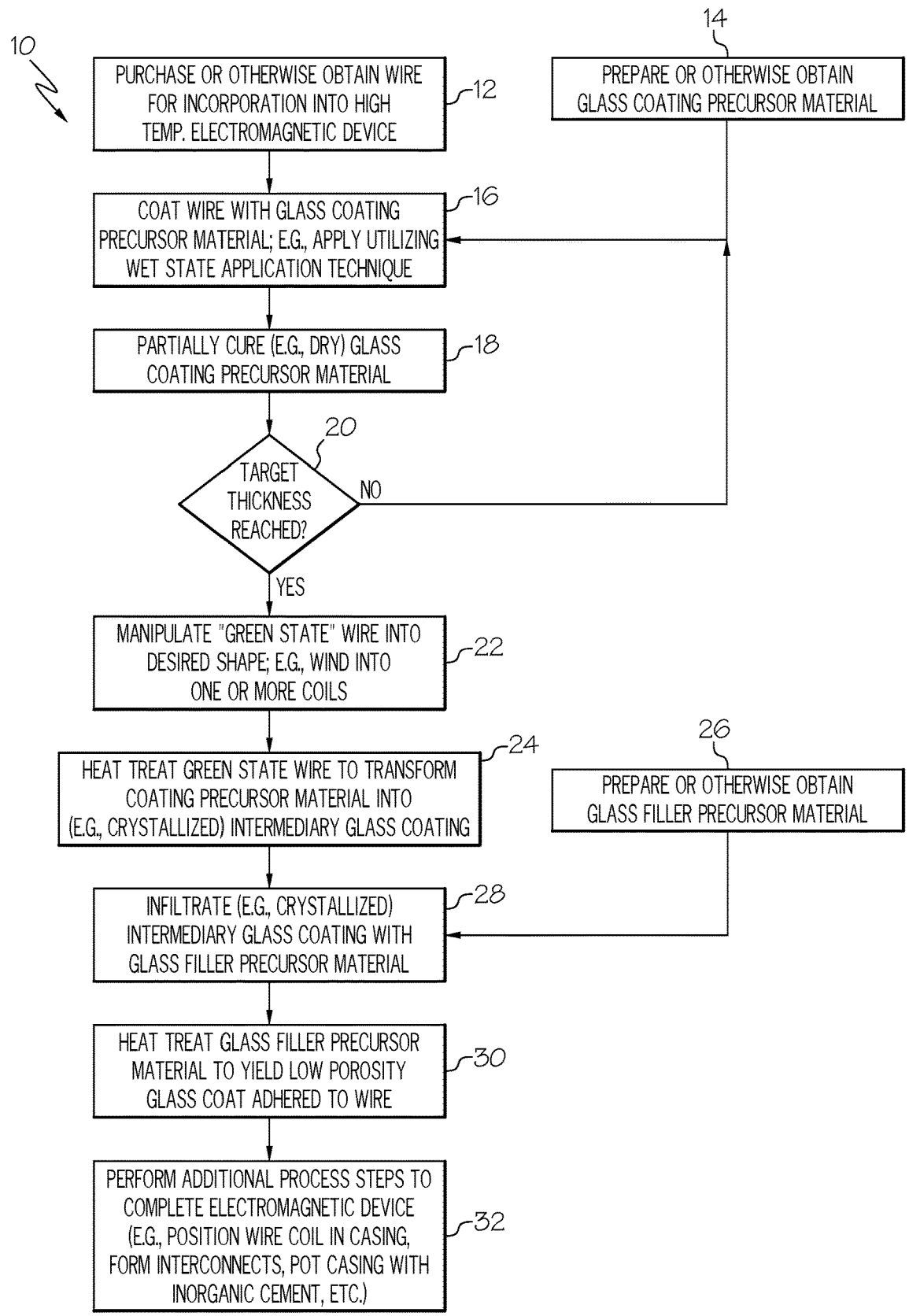
FIG. 1 is a flowchart of an exemplary method for fabricating high temperature EM devices containing wire coils electrically insulated by low porosity glass coatings, as illustrated in accordance with an exemplary embodiment of the present disclosure.

For simplicity and clarity of illustration, the drawing figures illustrate the general manner of construction, and descriptions and details of well-known features and techniques may be omitted to avoid unnecessarily obscuring the exemplary and non-limiting embodiments described in the subsequent Detailed Description. It should further be understood that features or elements appearing in the accompanying figures are not necessarily drawn to scale unless otherwise stated.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description.

Definitions

The following definitions apply throughout this document. Those terms not expressly defined here or elsewhere in this document are assigned their ordinary meaning in the relevant technical field.

Crystallized intermediary glass coating—a glass coating (defined below) having a crystalline (rather than amorphous) morphology throughout at least a majority of the coating's volume and subsequently processed to produce a low porosity glass coating (further defined below).

Essentially Free—containing less than 0.1% of a named constituent, by weight.

Glass coating—a coating primarily composed of one or more glasses, by weight.

High temperature electromagnetic (EM) device—a device (e.g., sensor or actuator) containing at least one EM wire coil and capable of sustained operation at temperatures approach or exceeding 300° C.

Low porosity glass coating—a glass coating (defined above) having a porosity less than 15% by volume and, in certain cases, less than 5% by volume.

OVERVIEW

There exists an ongoing demand for high temperature EM devices (sensors and actuators) having enhanced resistances to moisture ingress, high intensity vibration and shock, exposure to temperatures exceeding 300° C. (whether due to high environmental temperatures, heat generated by the EM device itself, or both) and other harsh operating conditions. Examples of such devices include, but are not limited to, Linear Variable Differential Transducer (LVDT) sensors, Rotary Variable Differential Transducer (RVDT) sensors, solenoids, actuation motors, resolvers, and torque motors. A key to enabling fabrication of such high temperature EM devices lies in the development of specialized dielectric wire coatings, which can withstand prolonged exposure to highly elevated temperatures at which organic dielectric materials breakdown and thermally decompose. One such dielectric wire coating is described in the following patent, which is hereby incorporated by reference: U.S. Pat. No. 8,484,831, issued by the United States Patent and Trademark Office (USPTO) on Jul. 16, 2013, and entitled "METHODS OF FORMING INSULATED WIRES AND HERMETICALLY-SEALED PACKAGES FOR USE IN ELECTROMAGNETIC DEVICES." This patent (hereafter, the "'831 patent") is owned by the Assignee of the present document, Honeywell International Inc., and describes methods for the fabrication specialized, low porosity glass coatings suitable for insulating wire coils contained in high temperature EM devices.

As just stated, the above-referenced '831 patent discloses methods for producing high temperature EM devices containing wire coils insulated by low porosity glass coatings. Generally, such glass coatings are produced by initially coating a magnet wire with a glass coating precursor material containing glass particles of a first type (hereafter, "base glass particles"). The glass coating precursor material may be provided as, for example, a flowable paste, which is applied to the wire and dried to yield a relatively flexible "green glass" wire. The green glass wire is then manipulated into a desired shape (e.g., a length of the wire may be wound into a coil) and thermally processed. During thermal processing, most, if not substantially all organic materials remaining within the glass coating are thermally decomposed and thereby removed from the coating. Firing is further performed to consolidate the base glass particles into a solid, continuous layer forming an intermediary glass coating. Afterwards, the intermediary glass coating may be infiltrated with a filler glass precursor material containing glass particles of a second type (hereafter, "filler glass particles"). A densification heat treatment process is then carried-out to integrate the filler glass particles into the intermediary glass coating and thereby yield a final, low porosity glass coating adhered to the wire. The resulting low porosity glass coating is not only capable of withstanding exposure to highly elevated temperatures, but also possesses enhanced resistance to moisture ingress, mechanical shock, and high intensity vibration.

During the above-described densification heat treatment process, undesired wire movement or migration can result in lowered voltage breakdown values and, in severe cases, electrical shorting of the completed EM device. To prevent or at least deter wire movement during the above-described densification heat treatment process, the base glass particles are typically chosen to have a significantly higher softening point than the filler glass particles. Further, during the densification heat treatment process, peak processing temperatures are controlled to exceed the melt point of the filler glass particles, but are generally maintained below the softening point of the base glass particles and the intermediary glass coating. In this manner, softening or reflow of the intermediary glass coating can be avoided to ensure a high level of wire immobilization during the densification heat treatment process. While such an approach is advantageous from the standpoint of wire immobilization, the usage of highly disparate glass types for the base and filler glass particles is associated with certain limitations. For example, by virtue of this approach there may exist an appreciable CTE mismatch between the selected glass types, which may detract from the structural integrity of the low porosity glass coating over time and across repeated thermal cycling. Additionally, the usage of disparate glass types can reduce chemical capability between the base glass particles, the filler glass particles, and other constituents of the low porosity glass coating.

To overcome the above-noted challenges, the following describes methods for producing glass coatings in which CTE mismatch between the base glass particles and the filler glass particles is reduced, if not eliminated, while chemical compatibility between the base and filler glass particles is maximized. Further, embodiments of the below-described fabrication method enable favorable reductions in CTE mismatch between the constituents of the low porosity glass coating, the magnetic wire to which the glass coating is adhered, and any dielectric potting material (e.g., an inorganic cement or high temperature silicone) utilized to fill void space within a vessel, housing, or casing containing the insulated wire coil. As a yet further benefit, embodiments of the below-described fabrication method prevent or at least minimize undesired wire movement during densification, despite potential softening or reflow of the intermediary glass coating. This may be accomplished by, for example, formulating the glass coating precursor material to contain an inorganic viscosity boosting or thickening agent, some or all of which remains within the intermediary glass coating following the intermediary heat treatment process. An exemplary process for producing a high temperature EM device containing coiled wires, which are insulated by low porosity glass coatings, will now be described in conjunction with FIGS. 1-3.

Examples of Processes for the Fabrication of EM Devices Containing Wire Coils Insulated by Low Porosity Glass Coatings FIG. 1 is a flowchart setting-forth a method 10 for producing high temperature EM devices containing wire coils insulated by low porosity glass coatings, as illustrated in accordance with an exemplary embodiment of the present disclosure. Due, at least in part, to the inclusion of such low porosity glass coatings, the below-described high temperature EM devices are well-suited for direct insertion into severe high temperature environments of the type previously described. Similarly, embodiments of the below-described high temperature EM devices are suitable for usage in applications in which the EM devices are operated under conditions (e.g., power levels) at which the EM devices generate highly elevated temperatures. As set-forth in FIG. 1, method 10 includes a number of process steps identified as STEPS 12, 14, 16, 18, 20, 22, 24, 26, 28, 30, 32. Depending upon the particular manner in which method 10 is implemented, each step generally illustrated in FIG. 1 may entail a single process or, instead, may entail multiple sub-processes. Furthermore, the steps illustrated in FIG. 1 and described below are provided by way of non-limiting example only. In alternative embodiments of method 10, additional process steps may be performed, certain steps may be omitted, and/or the illustrated steps may be performed in alternative sequences.

Method 10 commences at STEP 12 during which at least one magnet wire, which is suitably incorporated into a high temperature EM device, is purchased from a supplier or otherwise obtained. The particular type and gauge of magnet wire obtained during STEP 12 of method 10 and incorporated into the high temperature EM device will vary among embodiments. Suitable wire types include, but are not limited to, aluminum (anodized or non-anodized), silver, nickel, stainless steel, and clad-Cu magnet wires. For higher temperature applications, Cu wires cladded or plated with another metal or alloy are advantageously utilized; e.g., examples include Cu wire cores plated or cladded with Ni, as well as Cu wire cores cladded with stainless steels, Ni-chromium (Cr) alloys, Ni—Cr—Al alloys, and other high temperature alloys (e.g., superalloys). Generally, such claddings are ideally selected to have a relatively high ductilities and CTEs similar to that of the wire (e.g., Cu) core. Further, at highly elevated temperatures, such as a temperatures exceeding 300° C., certain claddings (e.g., Ni claddings) may diffuse into the Cu and result in reduced electrical conductivity over time; therefore, in such cases, stainless steel claddings and other claddings having a low Ni content (or that are substantially free of Ni) may be selected for usage. In embodiments, a nickel clad- or stainless steel clad-Cu wire may be obtained having a gauge of, for example, between 10 and 40 American wire gauge. In other embodiments, the selected magnet wire may have a different composition or a different gauge, noting that the below-described "green glass" process can accommodate virtually any desired wire gauge in producing the high temperature EM device.

Before, after, or concurrent with STEP 12, a glass coating precursor material is obtain (STEP 14). The glass coating precursor material can be obtained by, for example, purchase from a third party supplier or by independent preparation. Among other constituents, the glass coating precursor material contains a plurality of base glass particles composed of one or more glass types. The glass type or types selected for usage as the base glass particles will vary in relation to the desired properties of the intermediary glass coating produced pursuant to the intermediary heat treatment process conducted at STEP 24 of method 10 (described below); and, by extension, in relation to the desired properties of the final low porosity glass coating produced pursuant to the densification heat treatment process conducted at STEP 30 of method 10 (also described below). Generally, it is desirable for the selected glass type or types to have a relatively high CTE, as considered in the context of glasses. For example, the selected glass type may have a CTE (or, if a glass mixture is utilized, the glass mixture may have an average CTE) equal to or greater than one half the CTE of the wire core, while being less than the CTE of the wire core. Selecting the glass to have a CTE less than the wire core ensures that glass remains in compression (rather than in tension) after firing, which may, in turn, allow a CTE of mismatch with the metal wire core of several ppm/° C. Similarly, when the coated wire is disposed within a metal vessel, as described below in conjunction with STEP 32 of method 10, the selected glass type (or types) may have a CTE equal to or greater than one half the CTE of the metal vessel. Additionally or alternatively, in embodiments, the base glass particles may be composed of a glass having a CTE (or a glass mixture having an average CTE) ranging from about 10 to about 20 ppm/° C., inclusive. In still further embodiments, the CTE of the base glass particles contained within the glass coating precursor material may fall outside of the aforementioned range.

In addition to having a relatively high CTE, the base glass particles contained within the glass coating precursor material are also usefully selected to possess most, if not all of the following properties: (i) excellent dielectric properties at the intended operating temperatures of the EM device, which may exceed 300° C. and, perhaps, 500° C. depending upon application; (ii) the ability to form a relatively robust bond or adherence with the underlying magnet wire; (iii) acceptable chemical compatibility with the other constituents of the low porosity glass coating and EM device under high temperature operating conditions; and (iv) relatively high softening and melt points, both of which may exceed 350° C. in embodiments. Suitable glasses include certain dielectric glasses provided in paste form and formulated for compatibility with stainless steel substrates. Commercially-available examples of such glass pastes include ESL-4916 available from Ferro Corporation currently headquartered in Mayfield Heights, Ohio, and GPA2014-089 available from Heraeus Cermalloy, Inc. of Conshohocken, Pa.

In addition to the base glass particles, the glass coating precursor material also contains other ingredients or constituents; e.g., constituents added to facilitate application of the precursor material to the magnet wire, to tailor targeted properties of the glass coating, or both. Such additional constituents can include an organic liquid carrier or solvent, one or more organic binders, an inorganic nucleating agent, an inorganic viscosity boosting agent, or any combination thereof. Addressing first the organic liquid carrier, the liquid carrier or solvent may be added to the glass coating precursor material when desirably applied to the wire in a wet state as a paste, paint, or slurry. Suitable liquid carriers include alcohols and water, which may be added to the glass coating precursor material in sufficient quantity to achieve an appropriate viscosity for the selected wet-state application technique. In embodiments, the solvent is a high molecular weight alcohol resistant to evaporation at room temperature, such as alpha-terpineol or TEXINOL®, which is added to in sufficient quantity to transform the glass coating precursor material into a paste or slurry. Comparatively, with respect to the organic binder, the organic binder may be an acrylic, polyvinyl alcohol, polyethylene oxide, or another type of organic binder soluble in the selected solvent system. In one implementation, the glass coating precursor material contains between 5% and 15% acrylic, by weight, added for strength enhancing purposes. The organic liquid carrier, the organic binder, and any other organic constituents contained in the glass coating precursor material may be largely, if not wholly decomposed from the intermediary glass coating during the intermediary heat treatment process described below in conjunction with STEP 24 of method 10.

Embodiments of the glass coating precursor material may be formulated to further contain any number and type of inorganic constituents in addition to the base glass particles. Such inorganic constituents may include an inorganic nucleating agent, an inorganic thickening (viscosity boosting) agent, or a combination thereof. In contrast to the organic components of the glass coating precursor material, the inorganic nucleating agent and/or thickening agent, when present, may be resistant to thermal decomposition or burn-out during the below-described intermediary heat treatment process. Consequently, the inorganic components of the glass coating precursor material will typically remain, at least in substantial part, in the crystallized intermediary glass coating produced pursuant to STEP 24 of method 10; and, therefore, within the final low porosity glass coating produced pursuant to STEP 30 of method 10. Additional description of suitable inorganic nucleating agents and thickenings agents is provided below.

When present within the glass coating precursor material, the inorganic nucleating agent can assume the form of any inorganic dielectric material effectively promoting crystallization of the intermediary glass coating during the intermediary heat treatment process (STEP 24 of method 10). The inorganic nucleating agent may be provided in the form of inorganic dielectric particles, which promote the creation of nucleation cites for seeding crystallization during the below-described intermediary heat treatment process. The particular quantity, type or types, and particle size range of the inorganic nucleating agent(s) added to the glass coating precursor material will vary among embodiments and can be selected to fine tune the grain size and other morphological characteristics of the crystallized intermediary glass coating. So too may the heat treatment profile be controlled to achieve a desired grain size within the intermediary glass coating, as further discussed below in conjunction with STEP 24 of method 10. A non-exhaustive list of materials suitable for usage as the inorganic nucleating agent includes barium titanate and titanium oxide. In other embodiments, the glass coating precursor material may lack any such inorganic nucleating agent.

Addressing next the inorganic thickening or viscosity boosting agent, when present within the coating precursor material, this additive may assume the form of any inorganic dielectric material that: (i) remains, at least in substantial part, within the intermediary glass coating following the intermediary heat treatment process performed during STEP 24 of method 10, and (ii) that deters or physically impedes wire movement should the intermediary glass coating soften or reflow during the densification heat treatment process (STEP 30 of method 10). The inorganic thickening agent is further usefully selected to possess a non-spherical form; e.g., cross-linked fibers or non-spherical particles. Sheet-like platelets or laminae have been identified as a particularly well-suited for physically impeding wire movement or migration during densification and thereby preventing contact between the neighboring turns of the wire coil should the intermediary glass coating soften or reflow during the densification heat treatment process. Accordingly, in an embodiment in which the base glass particles are composed of a first glass type having a first softening point, while the below-described filler glass particles are composed of (i) a majority of the first glass type, by weight, and (ii) a minority of a second glass type, by weight, the second glass type having a second softening point less than the first softening point, the inorganic thickening agent may be provided in the form of platelet-shaped particles, with the platelet-shaped particles selected to possess an average maximum dimension greater than an average maximum dimension of the second plurality of glass particles. A non-exhaustive list of materials suitable for usage as the inorganic thickening agent includes Forsterite ($Mg_2SiO_4$), mica, vermiculite, and combinations thereof.

With continued reference to FIG. 1, the glass coating precursor material is next applied to the selected magnet wire at STEP 16 of method 10. Various application techniques can be utilized to apply the precursor material to the magnet wire. In certain implementations of method 10, a wet winding technique may be employed during which the glass coating precursor material is applied, in a wet state, to the magnet wire by brushing immediately prior to the location at which the wire is coiled around a support structure, such as a bobbin or the fins of a stator core. In another approach, the magnet wire can be drawn across or through any number of porous pads, such as sponges or felt pads, which are impregnated with a glass particle-containing paste serving as the glass coating precursor material. In such embodiments, the porous pads may form part of a paste application system further containing a pump, which drives active supply of the paste from a paste source to the porous pads. An actuator may be further provided to draw the magnet wire between surfaces of the porous pads during the paste application process. In embodiments, the paste application system can include more than one set of porous pads disposed in series, with each set of pads utilized to apply a different layer of paste to the wire. Alternatively, a single felt pad or pad assembly can be employed to form a layer on the magnet wire, and the coated magnet wire is re-inserted through the single porous pad or pad assembly on an iterative or repeated basis to form a desired number of paste layers over the wire.

Thermal processing (the intermediary heat treatment process) may commence after application of a single layer of the glass coating precursor material to the magnet wire. Alternatively, and as briefly noted above and indicated in FIG. 1 by STEPS 16, 18, 20, multiple layers of the glass coating precursor material may be applied to the wire (STEP 16) and dried or otherwise partially cured (STEP 18) in succession. In this instance, a sufficient number of layers may be applied to accumulate or build-up a green state coating body to a desired thickness over the outer surface of the magnet wire (STEP 20). For example, in certain embodiments, the glass coating precursor material may be applied as multiple layers until a body of precursor material is formed having a thickness ranging from about 5 to about 20 millimeters (mm). Drying may be performed on as needed basis by, for example, baking the coated wire in a specialized oven under process conditions sufficient to remove all or substantially all of the liquid solvent (e.g., greater than 95% of the solvent, by weight) from the newly-applied coating layers. Examples of suitable drying temperatures and times can be found in the above-referenced '831 patent. The end result is a green state wire composed of a magnet wire sheathed in a relatively flexible, dried version of the glass coating precursor material.

Continuing method 10, the green state wire may next be manipulated into a desired shape (STEP 22). Due to the relative flexibility of the dried coating precursor material, relatively aggressive wire manipulation can be performed, while the dried coating precursor material remains intact and adhered to the wire. In many cases, the dried coating precursor material may also be relatively non-abrasive, which may help minimize wear and prolong the lifespan of tooling utilized to wind or otherwise shape the wire during STEP 22 of method 10. Physical shaping of the green glass wire may involve winding a length of the wire into one or more multi-turn coils. For example, the green state wire may be wrapped around a permanent support structure, such as a bobbin or stator, during STEP 22 of method 10. Alternatively, the green state wire may be wound around a temporary support structure, such as a sacrificial or collapsible mandrel, which is later removed. The entire length of the wire may be wound into one or more coils in embodiments, in which case leads (e.g., lower gauge wires or wire braids) may be mechanically and electrically joined to the opposing wire ends prior to, during, or following the wire winding process. In other instances, only a portion or segment of the green glass wire may be wound into a coil during STEP 22.

After forming the green glass wire into the desired shape (STEP 22), an intermediary heat treatment process is conducted during STEP 24 of method 10 (FIG. 1). Intermediary heat treatment is conducted under process conditions (temperatures, durations, and atmospheric conditions) sufficient to transform the glass coating precursor material into an essentially continuous or coherent body of material, which may envelope the magnet wire along its entire length or at least a substantial portion thereof. In embodiments, crystallization of the intermediary glass coating may be induced or promoted during the intermediary heat treatment process; e.g., by formulating the glass coating precursor material to contain a nucleating agent and/or by controlling parameters of the heat treatment process to promote coating crystallization, as described more fully below. When at least a volumetric majority of the glass coating is crystallized following heat treatment, the intermediary glass coating is more specifically referred to herein as a "crystallized intermediary glass coating." Inducing crystallization of the intermediary glass coating can effectively raise the softening point (and melt point) of the coating relative to the softening point (and melt point) of the base glass particles contained in the glass coating precursor material. This, in turn, may provide greater flexibility in peak processing temperatures during the heat treatment process to decrease the likelihood of intermediary glass coating softening and wire movement, as discussed below. This notwithstanding, the intermediary glass coating need not be crystallized during the intermediary heat treatment process conducted during STEP 24 in all implementations of method 10.

As noted above, crystallization of the intermediary glass coating can usefully impart the intermediary glass coating with a modified (boosted) softening point, which exceeds the softening point of the base glass particles by an appreciable amount. For example, the intermediary heat treatment process may be performed such that modified softening point exceeds the softening point of the base glass particles by at least 50° C. and, in certain instances, by about 100 to about 200° C. in embodiments. This increase in softening point provides additional bandgap or enhanced flexibility in selecting the peak processing temperatures applied during the densification heat treatment process conducted during STEP 30 of method 10. Specifically, the boosted softening point of the intermediary glass coating, when crystallized, enables the selection of peak processing temperatures exceeding the softening point of base glass particles, while remaining below (or, perhaps, equivalent to or only slightly exceeding) the modified softening point of the crystallized intermediary glass coating. In certain implementations, this flexibility in peak processing temperature selection may be leveraged to allow the filler glass particles contained in the below-described filler glass material to be largely or entirely composed of the same glass type (or a similar glass type) as the base glass particles, if so desired. In this regard, the base glass particles may be composed of a first glass type, while the filler glass particles are at least predominately, if not wholly composed of the same (first) glass type by weight, in at least some embodiments of method 10. Chemical compatibility between the base glass particles and filler glass particles is consequently optimized, while CTE mismatch between the glass particles is reduced if not eliminated.

Figure 2:
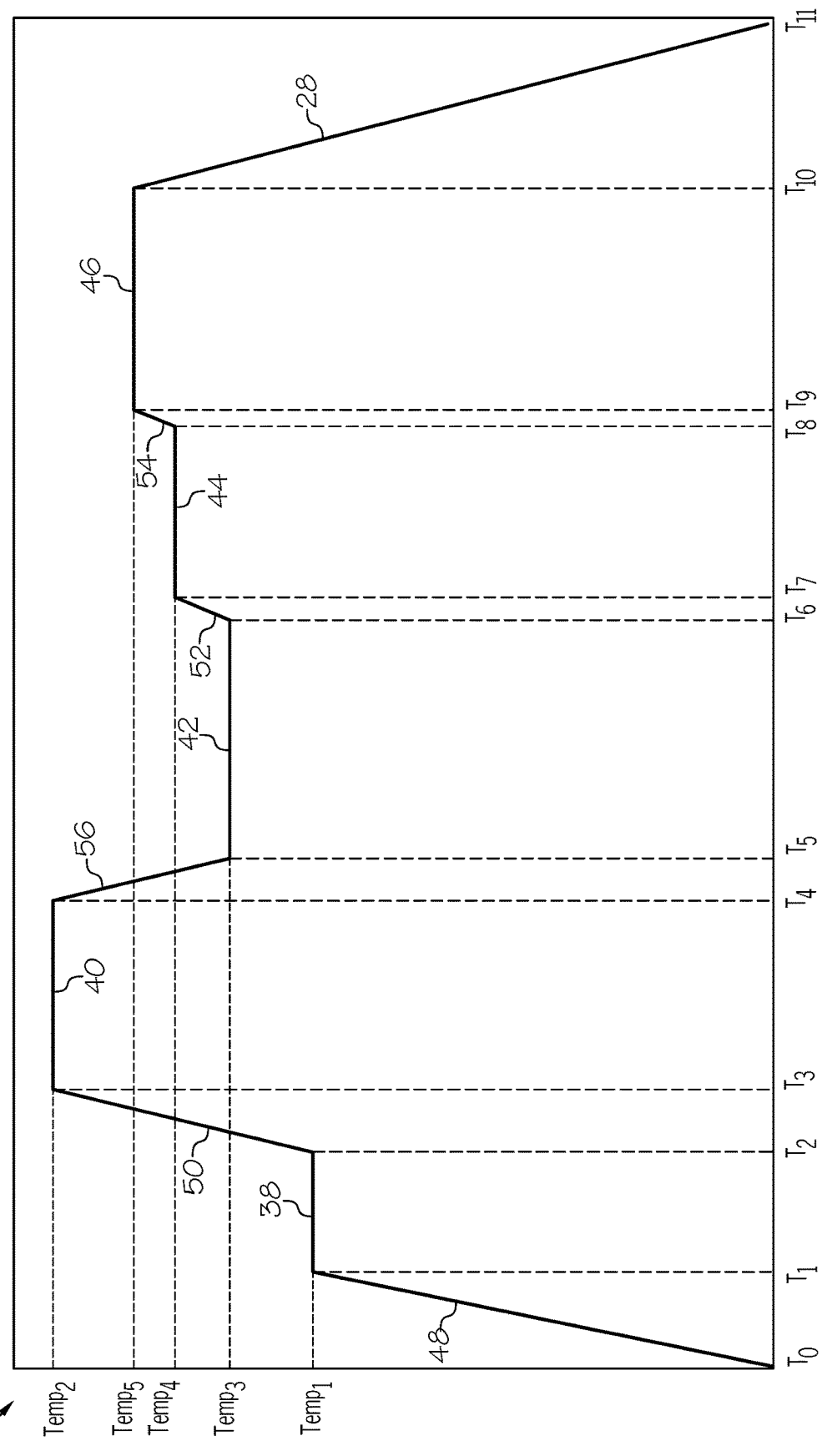
FIG. 2 is a graph illustrating an exemplary heat treatment profile for forming a crystallized intermediary glass coating from the glass coating precursor material during the fabrication method set-forth in FIG. 1.

Turning briefly to FIG. 2, an exemplary heat treatment schedule or profile 36 suitably followed during the intermediary heat treatment process carried-out during STEP 24 of method 10 (FIG. 1) is graphically presented. Heat treatment profile 36 represents an example of a heating schedule, which can be followed during STEP 24 to promote the formation of a crystallized intermediary glass coating from the precursor material applied to the magnet wire during STEPS 16, 18, 20 of method 10. In the illustrated example, heat treatment profile 36 includes a total of five distinct phases: (i) an organic (carbon) burnout phase 38, (ii) a firing phase 40, (iii) an annealing phase 42, (iv) a nucleation phase 44, and (v) a crystal growth phase 46. Several temperature ramp-up periods 48, 50, 52, 54 and temperature ramp down periods 56, 58 lead into phases 38, 40, 42, 44, 46, as appropriate, until termination of heat treatment profile at time $T_{11}$. In further embodiments, heat treatment profile 36 may be more complex and include any additional number of heat treatment phases. Additionally, if desired, heat treatments associated with the conditioning, annealing, or strengthening of base metals associated with adjacent structures designed into the EM device can be incorporated into this process. Finally, FIG. 2 is not drawn to scale, in a strict sense, such that the relative lengths of the line segments representative of phases 38, 40, 42, 44, 46 is not necessarily proportional to the relative duration of these phases.

After initiation of heat treatment profile 36 at time $T_0$, organic (carbon) burnout phase 38 is conducted at a peak temperature $temp_1$ for a time period $T_1$-$T_2$. As will all temperature and durations described in conjunction with heat treatment profile 36, $temp_1$ and time period $T_1$-$T_2$ will vary among embodiments. In certain instances, $temp_1$ and time period $T_1$-$T_2$ may be selected to remove at least 99% of carbon and, perhaps, all organic materials from the glass coating precursor material, by weight; e.g., in such embodiments, the parameters of burnout phase 38 may be selected such that the resulting intermediary glass coating is substantially free of organic materials. In one non-limiting embodiment, organic (carbon) burnout phase 38 may be conducted at a peak temperature ($temp_1$) between 500 to 600° C. for a duration of about 1 to about 6 hours in an open air environment. Afterwards, firing phase 40 is conducted at a higher peak temperature $temp_2$ for a time period $T_3$-$T_4$. Time period $T_3$-$T_4$ may vary from a few minutes to several hours depending upon multiple factors including $temp_2$, the composition of the glass coating precursor material, and the atmosphere in which the glass coating precursor material is fired. Generally, $temp_2$ will be selected to exceed the softening point of the glass particles contained within the glass coating precursor material. In various embodiments, and again by way of non-limiting example only, firing may be conducted at a peak temperature ($temp_2$) between about 700 and about 900° C. in an inert (e.g., nitrogen) atmosphere.

With continued reference to schedule 36 shown in FIG. 2, annealing of the glass coating precursor material is next conducted following firing phase 40 and, specifically, during annealing phase 42. After temperature ramp down leg 56, annealing phase 42 is conducted at a peak temperature $temp_3$ for a time period $T_5$-$T_6$. As generally indicated in FIG. 2 (again, not drawn to scale), $temp_3$ will typically be somewhat greater than the peak temperature applied during organic material burnout phase 38 ($temp_1$), but also typically significantly less than the peak temperature encountered during firing phase 40 ($temp_2$); e.g., in certain implementations, $temp_3$ may range from about 600 to about 700° C. The duration of annealing ($T_5$-$T_6$) may vary between embodiments, often from several hours to a few days. However, in a general sense, the peak processing temperatures and time period of annealing phase 42 will be selected to remove material stresses from the intermediary glass coating and will be determined, at least in part, by coating viscosity. As is firing phase 40, annealing phase 42 is beneficially carried-out in an inert (e.g., nitrogen) atmosphere.

Advancing next to nucleation phase 44 of exemplary heat treatment profile 36, this phase is carried-out at a peak temperature $temp_4$ for a time period $T_7$-$T_8$. Nucleation phase 44 may be followed by crystal growth phase 46, which is conducted at a peak temperature $temp_5$ for a time period $T_9$-$T_{10}$. The particular values of $temp_4$ and $temp_5$, and the respective durations of phases 44, 46 will vary among embodiments. Generally, the peak temperature ($temp_4$) and the duration of nucleation phase 44 ($T_7$-$T_8$ may be tailored to control grain size within the intermediary glass coating by, for example, promoting the formation of a greater or lesser number of nucleation cites prior to crystal growth phase 46. In certain embodiments, nucleation phase 44 may be conducted over a duration ($T_7$-$T_8$ less than the duration of crystal growth phase 46 ($T_9$-$T_{10}$). Comparatively, nucleation phase 44 may be conducted at a lower peak temperature (temp$_4$) than crystal growth phase 46 (temp$_5$), which, in turn, may be conducted at a lower peak temperature than firing phase 40 (temp$_2$) such that temp$_2$>temp$_4$<temp$_5$. By way of non-limiting example, temp$_4$ may be 50 to 150° C. less than temp$_5$, which may be 50 and 150° C. less than temp$_3$ in at least some implementations. Additionally or alternatively, in embodiments, the peak temperature during crystal growth phase 46 (temp$_5$) may be about 25 to about 100° C. greater than the peak temperature during nucleation phase 44 (temp$_4$), which may, in turn, be 25 to 100° C. higher than the peak temperature during annealing phase 42 (temp$_3$). In yet other embodiments, nucleation phase 44 may be omitted from heat treatment profile 36 or deemphasized (e.g., performed more briefly) when, for example, nucleation agents are added to the glass coating precursor material, as described above, thereby reducing or eliminating the need to produce additional nucleation sites through heat treatment. After crystal growth phase 46, temperature ramp down leg 58 is conducted over time period $T_{10}$-$T_{11}$, the intermediary glass coating is allowed to cool, and heat treatment profile 36 concludes.

As previously indicated, organic (carbon) burnout phase 38 may be performed in an open air environment, while firing phase 40 and annealing phase 42 are performed in an inert (e.g., nitrogen or partial vacuum) atmosphere. So too are nucleation phase 44 (when performed) and crystal growth phase 46 usefully conducted in an inert atmosphere. Accordingly, in at least some implementations of the intermediary heat treatment process, organic (carbon) burnout phase 38 is conducted in a first (e.g., open air) furnace, while phases 40, 42, 44, 46 are carried-out in a second furnace supporting an inert or partial vacuum atmosphere. In other embodiments, phases 38, 40, 42, 44, 46 may be conducted in the same furnace by modifying atmospheres between phase 38 and phases 40, 42, 44, 46, as appropriate. For example, in this latter regard, the intermediary heat treatment process conducted at STEP 24 of method 10 (FIG. 1) is conveniently carried-out in a tube furnace in an embodiment, while switching from airflow to nitrogen (or other inert gas) flow when transitioning from phase 38 to phase 40, with the nitrogen flow then maintained through the duration of phases 40, 42, 44, 46.

Returning once again to FIG. 1, after the intermediary heat treatment process, a filler glass precursor material is next prepared, purchased, otherwise obtained at STEP 26 of method 10. The filler glass precursor material may be similar or identical to the base glass precursor material in many respects. For example, the filler glass precursor material contains a second plurality of glass particles referred to herein as the "filler glass particles." The filler glass particles can be composed of a single glass type or, instead, may contain multiple glass types combined as a mixture. Additional discussion of the filler glass particles is provided below. In addition to the filler glass particles, the filler glass precursor material may also contain a liquid carrier or solvent, such as water or an alcohol of the type discussed above in conjunction with the initially-applied glass coating precursor material. Again, the amount of the liquid carrier or solvent may be tailored to achieve a desired viscosity; e.g., a viscosity suitable for transforming the filler glass precursor material into a paint, paste, or slurry suitable for wet state application over the outer surface of, and infiltration into the pores or voids spaces within, the intermediary glass coating. In certain cases, the filler glass precursor material may be formulated to contain the same organic solvent system or vehicle as does the glass coating precursor material. More preferably, however, the filler glass precursor material is formulated to contain a different organic solvent system and, specifically, an organic solvent system in which the base glass particles are less soluble as compared to the organic solvent system of the glass coating precursor material. Dissolution of the intermediary glass coating into the filler glass precursor material may thus be reduced or avoided when applied in a wet state over and infiltrated into the glass coating, as described below.

As previously indicated, the filler glass particles is usefully, although non-essentially predominately composed of the glass type selected for usage as the base glass particles; the term, "predominately composed" defines as containing over 50% of a named constituent or constituents, by weight. In certain embodiments, the filler glass particles and the base glass particles may each be composed of at least 90% and, perhaps, greater than 95% of the same glass type, by weight. In such embodiments, the above-described issues associated with softening and reflow of the intermediary glass coating may be addressed in one or more of the following manners. First, in implementations in which the softening point of the intermediary glass coating is modified (boosted) by crystallization, peak processing temperatures during the below-described densification heat treatment process may be maintained below the modified softening point of the intermediary glass coating to prevent coating reflow and wire movement. Concurrently, peak processing temperatures may be increased above the softening point of the filler glass particles and, perhaps, above melt point of the filler glass particles and/or the initial softening point of the base glass particles during the densification heat treatment process.

In addition to or as an alternative to boosting the softening point of the intermediary glass coating through crystallization during the intermediary heat treatment process, the above-described issues associated with potential softening and reflow of the intermediary glass coating may be addressed in other manners, as well. As noted above, the intermediary glass coating may be formulated to include an inorganic thickening (viscosity boosting) agent, such as a dielectric mineral additive present in laminae (sheet-like) form. In such embodiments, a small degree of softening or reflow of the intermediary glass coating may be tolerated during the below-described densification heat treatment process, with the inorganic thickening agent deterring undesired wire movement. In this case, peak temperatures during the densification process may reach or exceed the softening point of the intermediary glass coating. Alternatively, a combination of the above-mentioned approaches may be utilized such that the intermediary glass coating is imparted with a crystallized morphology and boosted softening point, while further containing an inorganic thickening agent. In this case, if desired, peak temperatures occurring during the densification heat treatment process may be maintained below the softening point of the crystallized intermediary glass coating, with the inorganic thickening agent serving as a failsafe mechanism to deter wire movement should some degree of softening or reflow of the intermediary glass coating inadvertently occur during the heat treatment process.

In addition to or in lieu of the solution set-forth above, issues associated with potential softening and reflow of the intermediary glass coating may be addressed in a still further manner; that is, by formulating the filler glass precursor material to contain a melt point suppressant. For example, a glass mixture may be utilized such that the filler glass particles are predominately composed of the same glass type as are the base glass particles (hereafter, "the principal glass type"), but further contain a lesser amount of another glass type having a lower melt point than does the principal glass type. Stated differently, in embodiments in which the base glass particles are composed of a first glass type, the filler glass precursor material may be formulated to contain a glass mixture composed of: (ii) a majority of the first glass type, by weight; and (ii) a minority of a second glass type, by weight, with the second glass type having a second softening point less than the first softening point. In this case, the particular glass selected for usage as the second glass type will vary depending upon the first glass type and other factors. However, suitable commercially-available glass types may include one or more of the following commercially-available glasses: KOARTAN 5650, FERRO OG15-335, and HERAEUS IP6075 & IP6080A. In other embodiments, a different type of melt point suppressant may be included in the filler glass precursor material, such as a flux, or the filler glass precursor material may lack any such melt point suppressant.

Advancing next to STEP 28 of method 10 (FIG. 1), the intermediary glass coating is next infiltrated with the filler glass precursor material. In embodiments, the filler glass precursor material is infiltrated into the pores of the intermediary glass coating by vacuum impregnation. An overglazes or outer layer of the filler glass precursor material may also be applied to the exterior of the intermediary glass coating to form an added barrier against moisture ingress. Various other infiltration techniques can be employed to draw the filler glass precursor material into at least a portion of the intermediary glass coating and, preferably, to disperse the filler glass material throughout the substantial entirety of the intermediary glass coating. The filler glass precursor material is usefully imparted with a relatively low viscosity to facilitate flow of the filler glass particles throughout the pores or void space within the intermediary glass coating. The average particle size and shape of the filler glass particles is advantageously selected to promote particle penetration through the relatively small pores and tortuous internal passages of the intermediary glass coating. Accordingly, in at least some embodiment, the filler glass particles may be selected have an average maximum cross-sectional dimension (e.g., an average diameter when the particles have a spherical shape) less than the average maximum cross-sectional dimension of the base glass particles.

Next, at STEP 30 of method 10, a densification heat treatment process is conducted to integrate (melt or sinter) the filler glass particles and yield a low porosity glass coating adhered to the wire coil. The selected process conditions will vary among embodiments; however, in one non-limiting example, the densification heat treatment process includes a firing phase conducted at an average temperature between about 500 to about 800° C. for a predetermined duration. In certain embodiments, the peak temperatures of the densification heat treatment process may exceed the softening point of the filler glass particles and, perhaps, exceeding the softening point of the base glass particles, while being maintained below the modified (boosted) softening point of the crystallized intermediary glass coating. This, in turn, may prevent reflow or softening of the intermediary glass coating to ensure a high level of wire immobilization during the densification heat treatment process. In other embodiments, the peak process temperatures during STEP 30 may exceed the softening point of crystallized intermediary glass coating to a certain extent; however, the crystallized intermediary glass coating may contain an inorganic thickening agent which deters wire movement despite the slight softening or reflow of the crystallized intermediary glass coating, as described above.

Various other phases may also be performed during the densification heat treatment process including an organic material burnout or decomposition phase, which may be conducted at a lower average temperature ahead of the firing phase to thermally decompose most, if not substantially all organic materials from the final low porosity glass coating. For example, the densification heat treatment process may also be tailored to remove carbon or carbon-containing (organic) materials remaining within the intermediary glass coating, within the filler glass precursor material, or both. Consequently, the low porosity glass coating may be essentially free of (that is, contains less than 0.1% by weight) organic materials. The high temperature operating characteristics of the low porosity glass coating may be enhanced as a result by, for example, reducing or preventing undesired effects (e.g., outgassing) during subsequent usage within a high temperature environment; e.g., an environment characterized by peak temperatures approaching or exceeding 300° C., whether such thermal extremes occur naturally within the environment, are self-generated by the EM device, or a combination thereof.

Pursuant to STEP 30 of method 10, a low porosity glass coating adhered to the wire coil is thus produced. In embodiments, the resulting glass coating may have a relatively low porosity, such as a porosity less than 15% and, perhaps, less than 5% by volume. Further, the porosity may be largely closed in structure, particularly toward the outer regions of the glass coating. For this and other reasons, the glass coating may be highly resistant to moisture ingress and damage or spallation due to mechanical shock and aggressive vibration. Comparatively, other known ceramic wire coatings may have a (e.g., open) porosity approaching or exceeding 50% to 60%, by volume. As a further benefit, and as briefly noted above, embodiments of the final glass coating may be essentially free of organic materials (that is, contain less than 0.1% of organic material, by weight) and/or may be essentially free of undesired constituents including lead, cadmium, and nickel. Embodiments of this low porosity glass coating produced in accordance with method 10 have demonstrated reliable operation at temperatures approaching or exceeding 500° C. Additionally, high voltage breakdown values (e.g., on the order of 600 volts per millimeter) have been achieved in at least some instances of the EM device reduced to practice.

Lastly, at STEP 32 of method 10, additional process steps are performed as appropriate to complete fabrication of the high temperature EM device. Such additional process step can include placement of the coated wire coil in a vessel, housing, or casing. Any void space within the vessel may be potted with a dielectric material after placement of the coated wire coil therein. Potting of the vessel may provide enhanced coil immobilization, improved moisture resistance, better thermal conduction for heat dissipation, and other benefits. Suitable potting materials include silicone encapsulants and dielectric cements. In one embodiment, a water-activated, silicate-based cement, such as the sealing cement bearing Product No. 33S and commercially available from the SAUEREISEN® Cements Company, Inc., headquartered in Pittsburgh, Pa. In other embodiments, a high temperature silicon may be utilized as the selected potting material, such as CERMACAST® 905 High Temperature Silicone. Generally, the inorganic potting material is usefully selected to have CTE, which is greater than the CTE of the low porosity glass coating. Additionally, in at least some embodiments, the CTE of the inorganic porting material may be substantially equivalent to (that is, differs by no more than 10% as compared to) the CTE of the wire core. The CTE of metal vessel, when included in the EM device, may also be substantially equivalent to the CTE of the inorganic potting material and/or the CTE of the wire core. Any interconnections between the coated wire coil and other electrical components (e.g., feedthroughs) may be formed prior to or after potting, as desired.

In the above-described manner, a high temperature EM device including a magnet wire coil protected by a low porosity glass coating is produced. Embodiments of the EM device may have a relatively high resistance to moisture increase due to the exceptionally low porosity of the glass coating. This relative insensitivity to moisture ingress may enable a decreased reliance on hermetic enclosures for moisture protection. Therefore, in at least some embodiments of the EM device, the vessel in which the glass-insulated wire coil is disposed may be sealed by, for example attachment of a lid or cover piece, but is generally not required to provide a true hermetic environment. Manufacturing may consequently be eased by, for example, eliminating the need for specialized feedthroughs and circumferential weld joints to decrease cost. These benefits notwithstanding, the glass-insulated wire coils can be enclosed in hermetic vessels in further embodiments of the high temperature EM device, if so desired. This concludes the present iteration of EM device fabrication method 10.

Figure 3:
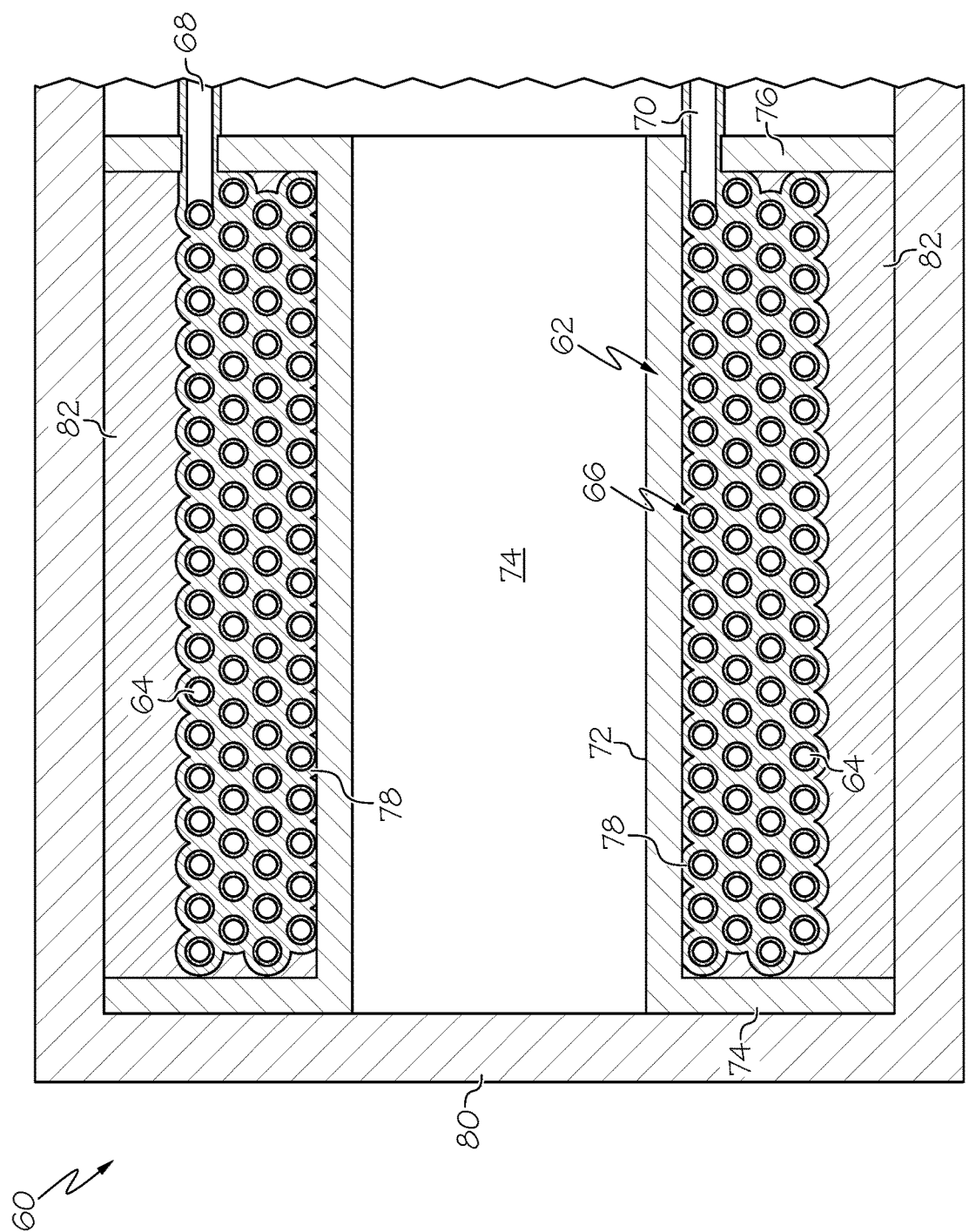
FIG. 3 is a cross-sectional view of a high temperature EM device (partially shown), which contains a wire coil electrically insulated by low porosity glass coating and which may be produced pursuant to the exemplary fabrication method set-forth in FIG. 1.

FIG. 3 is a generalized cross-sectional view of a high temperature EM device 60 (partially shown), which may be fabricated pursuant to an embodiment of method 10 (FIG. 1). EM device 60 includes a support structure 62 around which at least one magnet wire 64 is wound to form a multi-layer, multi-turn EM coil 66 or, more simply, "wire coil 66." Coiled magnet wire 64 may be formed from a magnet wire fabricated from aluminum, silver, nickel, or clad-Cu, such as nickel-clad Cu, as illustrated. In the illustrated example, support structure 62 assumes the form of a hollow spool or bobbin having an elongated tubular body 72, a central channel 73 extending through tubular body 72, and first and second flanges 74, 76 extending radially from opposing ends of wire coil 66. In other embodiments, support structure 62 may assume another form, such as a stator core having fins around which one or more coils of magnet wire 64 are disposed. Opposing end portions 68, 70 of magnet wire 64 may extend from wire coil 66 through flange 76 for electrical interconnection to another non-illustrated device or electrical conductor included in or external to EM device 60. In other embodiments, the entirety of magnet wire 64 may be formed into a coil, and leads may be joined to the wire ends by, for example, crimping or brazing.

Neighboring turns of wire coil 66 are insulated by a low porosity glass coating 78, such as any one of the low porosity glass coatings described above in conjunction with FIGS. 1 and 2. In addition to providing electrical insulation between neighboring turns of wire coil 66, low porosity glass coating 78 serves as a bonding agent providing mechanical isolation and position holding of magnet wire 64. As further indicated in FIG. 3, low porosity glass coating 78, wire coil 66, and support structure 72 may be disposed within a (e.g., metallic) housing, container, or vessel 80. A dielectric potting material 82 may fill the annular void space within vessel 80 surrounding or extending around wire coil 66 and contact low porosity glass coating 78. In embodiments, dielectric potting material 82 is composed of an inorganic cement or a high temperature silicon of the type previously described. The respective CTEs of potting material 82 and the core of magnet wire 64 may differ by an amount less than 4 ppm/° C. and, more operably, by an amount less than 2 ppm/° C. in embodiments. For example, in one non-limiting implementation, the wire core may be composed of Cu and have a CTE of approximately 17 ppm/° C., while potting material 82 may possess a CTE of 17 ppm/° C.±1. Comparatively, the base glass particles contained in the above-described glass coating precursor material may be selected to have an average CTE greater than at least one half the respective CTEs of the wire core and the potting material. Due at least in part to the provision of low porosity glass coating 78 and potting material 82, high temperature EM device 60 possesses enhanced resistance to moisture ingress, mechanical shock, and high intensity vibration. EM device 60 is consequently well-suited for direct insertion into severe high temperature environments of the type previously described.

CONCLUSION

The foregoing has provided high temperature EM devices capable of prolonged, reliable operation, while remaining relatively insensitive to moisture ingress, mechanical shock, aggressive vibration, highly elevated thermal extremes, and other such conditions encountered in severe high temperature environments. The foregoing has also provided methods for fabricating such high temperature EM devices, as well as electrically-insulated wire coils suitable for usage in such high temperature EM devices. In one embodiment, the method includes the steps or processes of: (i) applying a glass coating precursor material onto a wire, the glass coating precursor material containing a first plurality of glass particles having an initial softening point; (ii) heat treating the glass coating precursor material, after application onto the wire, under process conditions producing a crystallized intermediary glass coating having a modified softening point exceeding the initial softening point; (iii) infiltrating the crystallized intermediary glass coating with a filler glass precursor material containing a second plurality of glass particles; and (iv) heat treating the filler glass precursor material to consolidate the second plurality of glass particles into the crystallized intermediary glass coating and yield a low porosity glass coating adhered to the wire.

In certain embodiments, the first plurality of glass particles may contain at least a majority of a first glass type, by weight, while the second plurality of glass particles contains at least a majority of the first glass type, by weight. In such embodiments, the first plurality of glass particles consists essentially of the first glass type, by weight. In other embodiments, the first plurality of glass particles may contain a first glass type having a first softening point, and the filler glass precursor material may be formulated to contain a glass mixture composed of (i) a majority of the first glass type, by weight, and (ii) a minority of a second glass type, by weight, with the second glass type having a second softening point less than the first softening point. In other embodiments, the glass coating precursor material may be formulated to contain an inorganic thickening agent, which increases a viscosity of the crystallized intermediary glass coating when heated beyond the modified softening point. The inorganic thickening agent may be provided in the form of platelet-shaped particles in certain instances; and, if desired, the platelet-shaped particles may be selected to possess an average maximum dimension greater than an average maximum dimension of the second plurality of glass particles.

In yet further embodiments, heat treating the glass coating precursor material comprises may include: (i) conducting a firing phase at a first peak temperature; (ii) after the firing phase, conducting a nucleation phase at a second peak temperature less than the first peak temperature; and (iii) after the nucleation phase, conducting a crystal growth phase at a third peak temperature greater than the second peak temperature and less than the first peak temperature. In other embodiments, the method may further include the step or process of inserting a coiled length of the wire and the low porosity glass coating into a vessel after heat treating the filler glass precursor material. Further, after inserting the coil length of the wire and the low porosity glass coating into the vessel, at least a portion of the vessel may be filled with an inorganic potting material having a CTE exceeding a CTE of the first plurality of glass particles and a CTE of the second plurality of glass particles.

In further implementations, the method may further include selecting the first plurality of glass particles to have a first average particle size, while further selecting the second plurality of glass particles to have a second average particle size less than the first average particle size. Additionally or alternatively, the glass coating precursor material may be formulated to contain about 0.1% to about 5% of a nucleating agent, by weight. Finally, in embodiments, the step or process of infiltrating may entail providing the filler glass precursor material as a paste applied to an exterior of the crystallized intermediary glass coating and infiltrating the paste into pores of crystallized intermediary glass coating utilizing a vacuum impregnation process.

While multiple exemplary embodiments have been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended Claims.

What is claimed is:

1. A method for fabricating a high temperature electromagnetic device, the method comprising:
    applying a glass coating precursor material onto a wire, the glass coating precursor material containing a first plurality of glass particles having an initial softening point;
    heat treating the glass coating precursor material, after application onto the wire, under process conditions producing a crystallized intermediary glass coating having a new softening point exceeding the initial softening point;
    infiltrating the crystallized intermediary glass coating with a filler glass precursor material containing a second plurality of glass particles; and
    heat treating the filler glass precursor material to consolidate the second plurality of glass particles into the crystallized intermediary glass coating and yield a low porosity glass coating adhered to the wire, the low porosity glass coating having a porosity less than 15% by volume, wherein heat treating the glass coating precursor material comprises:
    conducting a firing phase at a first peak temperature;
    after conducting the firing phase, conducting a nucleation phase at a second peak temperature less than the first peak temperature; and
    after conducting the nucleation phase, conducting a crystal growth phase at a third peak temperature greater than the second peak temperature and less than the first peak temperature.

2. The method of claim 1 further comprising:
    after heat treating the filler glass precursor material, inserting a coiled length of the wire including the low porosity glass coating into a vessel; and
    after inserting the coil length of the wire including the low porosity glass coating into the vessel, filling at least a portion of the vessel with an inorganic potting material having a Coefficient of Thermal Expansion (CTE) exceeding a CTE of the first plurality of glass particles and a CTE of the second plurality of glass particles.

3. A method for fabricating a high temperature electromagnetic device, the method comprising:
    applying a glass coating precursor material onto a wire, the glass coating precursor material containing a first plurality of glass particles having an initial softening point and selecting the first plurality of glass particles to have a first average particle size;
    heat treating the glass coating precursor material, after application onto the wire, under process conditions producing a crystallized intermediary glass coating having a new softening point exceeding the initial softening point;
    infiltrating the crystallized intermediary glass coating with a filler glass precursor material containing a second plurality of glass particles, and selecting the second plurality of glass particles to have a second average particle size different than the first average particle size; and
    heat treating the filler glass precursor material to consolidate the second plurality of glass particles into the crystallized intermediary glass coating and yield a low porosity glass coating adhered to the wire and the low porosity glass coating has a porosity less than 15% by volume.

4. The method of claim 3 wherein the first plurality of glass particles comprises a first glass type; and
    wherein the second plurality of glass particles comprises at least the first glass type.

5. The method of claim 4 wherein the first plurality of glass particles consists essentially of the first glass type.

6. The method of claim 3 wherein the first plurality of glass particles comprises the first glass type having the initial softening point, and wherein the method further comprises formulating the filler glass precursor material to contain a glass mixture comprising:
    the first glass type; and
    a second glass type having a second softening point less than the first softening point.

7. The method of claim 3 further comprising formulating the glass coating precursor material to contain an inorganic thickening agent, which increases a viscosity of the crystallized intermediary glass coating when heated beyond the new softening point.

8. The method of claim 7 further comprising providing the inorganic thickening agent in the form of platelet-shaped particles.

9. The method of claim 8 further comprising selecting the platelet-shaped particles to have an average maximum cross-sectional dimension greater than an average maximum cross-sectional dimension of the second plurality of glass particles.

10. The method of claim 3 further comprising formulating the glass coating precursor material to contain about 0.1% to about 5% of a nucleating agent, by weight.

11. The method of claim 3 wherein infiltrating comprises:
providing the filler glass precursor material as a paste applied to an exterior of the crystallized intermediary glass coating; and
infiltrating the paste into pores of crystallized intermediary glass coating utilizing a vacuum impregnation process.

12. A method for producing a high temperature electromagnetic device, the method comprising:
forming, over an outer surface of a wire, an intermediary glass coating composed of at least a first glass, by weight, the first glass having a first Coefficient of Thermal Expansion (CTE), forming comprising:
applying a glass coating precursor material onto the wire, the glass coating precursor material containing particles composed of the first glass;
performing an intermediary heat treatment process to consolidate the particles composed of the first glass into an intermediary glass coating;
infiltrating the intermediary glass coating with a filler glass precursor material, the filler glass precursor material containing particles composed of a second glass having a second CTE substantially equivalent to the first CTE;
after infiltrating the intermediary glass coating with the filler glass precursor material, performing a densification heat treatment process to consolidate the particles composed of the second glass into the intermediary glass coating and yield a low porosity glass coating adhered to the wire, the low porosity glass coating having a porosity less than 15% by volume;
after performing the densification heat treatment process, placing a coiled length of the wire in a vessel; and
after placing the coiled length of the wire in the vessel, at least partially filling an interior of the vessel with an inorganic cement having a third CTE less than the first CTE and less than the second CTE.

13. The method of claim 12 wherein performing an intermediary heat treatment process comprises:
conducting a firing phase at a first peak temperature;
after the firing phase, conducting a nucleation phase at a second peak temperature less than the first peak temperature; and
after the nucleation phase, conducting a crystal growth phase at a third peak temperature greater than the second peak temperature and less than the first peak temperature.

14. The method of claim 12 further comprising carrying-out the intermediary heat treatment process under process conditions inducing crystallization of at least a portion of the intermediary glass coating.

15. The method of claim 12 comprising formulating the glass coating precursor material to contain, in addition to the particles composed of the first glass:
a nucleating agent promoting crystallization of the intermediary glass coating during the intermediary heat treatment process; and
an inorganic thickening agent increasing a viscosity of the intermediary glass coating during reflow.

* * * * *